US00RE37346B1

(19) United States
(12) Reissued Patent
Frawley et al.

(10) Patent Number: US RE37,346 E
(45) Date of Reissued Patent: Sep. 4, 2001

(54) SEATING AND KNEELING APPLIANCE

(76) Inventors: Deidre M. Frawley, 11 Long Bridge Dr., Mt. Laurel, NJ (US) 08054; Mark A. Frawley, 1029 Primrose La., Coopersburg, PA (US) 18036

(21) Appl. No.: 09/156,991

(22) Filed: Sep. 18, 1998

Related U.S. Patent Documents

Reissue of:
(64) Patent No.: 5,642,535
Issued: Jul. 1, 1997
Appl. No.: 08/582,321
Filed: Jan. 3, 1996

(51) Int. Cl.[7] ..... A47K 3/00
(52) U.S. Cl. ..... 4/559; 4/580
(58) Field of Search ..... 4/559, 571.1, 578.1, 4/580; 297/423.11, 423.12

(56) References Cited

U.S. PATENT DOCUMENTS

| | | | | |
|---|---|---|---|---|
| D. 35,304 | | 11/1901 | Pendergast . | |
| 2,140,902 | | 12/1938 | Fischer | 4/185 |
| 3,976,155 | * | 8/1976 | Esch | 280/32.5 |
| 4,356,575 | | 11/1982 | Terry | 4/559 |
| 4,385,408 | | 5/1983 | Rhodes | 4/523 |
| 4,534,590 | | 8/1985 | Yamamura et al. | 297/180 |
| 4,630,323 | | 12/1986 | Sage et al. | 4/580 |
| 4,632,410 | * | 12/1986 | Bainbridge et al. | 280/32.5 |
| 4,650,249 | | 3/1987 | Serber | 297/313 |
| 4,746,167 | * | 5/1988 | Palmer et al. | 297/423.12 |
| 4,913,487 | | 4/1990 | Breckel et al. | 297/14 |
| 4,937,897 | | 7/1990 | Barnable | 4/580 |
| 5,313,675 | * | 5/1994 | Tinen | 4/580 |
| 5,401,078 | | 3/1995 | Riach | 297/423.11 |
| 5,496,247 | * | 3/1996 | Anderson | 297/423.11 X |
| 5,577,800 | * | 11/1996 | Earl | 297/423.12 X |

* cited by examiner

*Primary Examiner*—Charles E. Phillips
(74) *Attorney, Agent, or Firm*—Flanagan & Flanagan; John R. Flanagan; John K. Flanagan

(57) ABSTRACT

What is disclosed herein is a seating and kneeling appliance which is adaptable to and is useful for providing comfort and support to a person who is cleaning a bathtub or assisting another person in the bathtub. The device is fabricated from essentially from plastic and is foldable. In use, the device rests on the outside wall of the bathtub and on the floor to provide support for an individual that is using the device.

16 Claims, 2 Drawing Sheets

SEATING AND KNEELING APPLIANCE

Matter enclosed in heavy brackets [ ] appears in the original patent but forms no part of this reissue specification; matter printed in italics indicates the additions made by reissue.

The invention disclosed and claimed herein deals with a seating and kneeling appliance which is suitable for use on a bathtub for providing support for a person clearing a bathtub or assisting another person in the bathtub.

BACKGROUND OF THE INVENTION

This invention deals with a means of providing support to a person cleaning a bathtub or providing assistance to another person in a bathtub and is intended to ease the effort of this kind of activity. Just about every person who has been confronted with the tasks set forth above has wished at one time or another that there was available a device that would lend support and aid in relieving the uncomfortable kneeling or bending position required to carry out the above-described activities. Many kneeling devices or pads have been developed to alleviate the uncomfortable kneeling or bending position with an intention of relieving such condition, even to the extent that pain associated with this type of activity can be eliminated from the shoulders, neck, and back of the person giving assistance.

One such device which has been incorporated into the structure of the bathtub can be found in U.S. Pat. No. 35,304, issued on Nov. 19, 1901 to Pendergast. This device is fabricated from the cast iron that the tube is fabricated from. This device does not have a fold up construction, and does not have a seating arrangement in combination with the kneeling bench, and further does have any pads.

A second device is that disclosed in U.S. Pat. No. 2,140, 902, issued on Dec. 20, 1938 to Fischer, in which an absorbent bath mat with an apron is used for a kneeling pad at the side of a modern bathtub.

Yet another device is that disclosed in U.S. Pat. No. 4,356,575, issued Nov. 2, 1982 to Terry, which shows a cushioned or padded kneeling appliance which is adaptable to the side of a modern bathtub. The device is padded at the top to provide support and comfort to the assisting persons forearms and elbows and pads are provided which are supported by the floor, which are useful to provide comfort and support for the assisting persons knees.

Still another device that is adaptable to the outside wall of a modern bathtub is that shown in U.S. Pat. No. 4,937,897, which issued Jul. 3, 1990 to Barnabie. This device is very similar to the Terry device in that it provides comfort and support for both forearms and elbows, and for knees. The device is comprised of cushions secured to a sheeting at spaced portions to provide a foldable device and also to provide a pocket for holding articles used in the bath.

On the other hand, there are also prior art devices that show the use of chairs having back supports and seats for persons which are orthopedically or ergonomically designed so as to prevent pain in the waist or back of the user.

For example, U.S. Pat. No. 4,534,590, which issued Aug. 13, 1985 to Yamamura, et al, shows a chair which is orthopediacally improved. The device is characterized by a seat that is freely forwardly, downwardly inclinable to a point about 20° below the horizontal, and is further characterized by a forwardly protruding cross-bar portion that provides support for the lumbar region of the spine. This chair can be a regular chair or it can be a squat chair, the latter chair being useful alongside the front wall of a bathtub. However, there is not provided a front support for the device.

There is further described in U.S. Pat. No. 4,650,249, which issued Mar. 17, 1987 to Serber, an ergonomic seating assembly system with a front chest support component, a pelvis tilt seat component, and related attachments. This seating assembly is designed so as to be adaptable to a table top, counter or the like.

Finally, the applicants are aware of the disclosure in U.S. Pat. No. 5,401,078, which issued on Mar. 28, 1995, to Riach, in which a unitary, portable, foldable and adjustable therapy chair is provided.

None of the devices of the prior art provide the benefits of the device of the instant invention.

THE INVENTION

The invention herein deals with a seating and kneeling appliance which is adaptable to and is useful for providing comfort and support to a person who is cleaning a bathtub or assisting another person in the bathtub.

Thus, the invention is a seating and kneeling appliance comprising in combination a forward unit of unitary construction having a T-shaped configuration. The T-shaped configuration is comprised of a top rest and an upper support shaft. The top rest has a bottom, a top surface, a near wall, a distal wall, and two essentially identical opposing ends.

The upper support shaft has a seat side, a forward side, a bottom, a top end, and two identical side walls wherein the top rest is integrally surmounted on the top end of the upper support shaft such that the near wall of the top rest is essentially centered on the upper support shaft.

Further, the top rest has an inverted L-shaped construction to provide a deep channel in the bottom of the top rest, wherein the deep channel is formed from the top rest near wall and the top rest distal wall.

The support shaft has an enlarged opening in the seat side which extends through the forward side and near the upper support shaft bottom end. The enlarged opening has, obviously, side interior walls. Each of the side interior walls has a side interior wall top end and a side interior wall bottom end and a slotted opening therein that extends essentially from the side interior top end to the side interior bottom end, wherein each slotted opening passes through the support shaft side walls.

There is a second, or lower unit of unitary construction having a flat T-shaped configuration comprised of a central support shaft having a U-shaped configuration, a central support shaft front end and a central support shaft back end having a central support shaft top surface, a central support shaft top surface, and identical central support shaft side walls.

The central support shaft has essentially identical pad rests mounted integrally, laterally thereon, near the central support shaft front end, and each pad rest is surmounted by pads.

The central support shaft has a seat surmounted on the central support back end on the central support top surface, the seat being surmounted by a pad. The seat also has a seat front end.

The central support shaft has an enlarged opening therethrough, beginning at the seat front end and extending through the central shaft front end, to form two, essentially identical side shafts having front terminal ends.

Each of the front terminal ends is integrally surmounted by a pin block, and each pin block has a pin block inside surface.

Also, each said pin block has essentially centered, and securely anchored therein, a pin, such that when the components are combined, one of the pins is insertable in each of the respective slotted openings in the interior side walls of the upper support shaft, such that the components are connected together, and each is rotational with respect to the other.

DETAILED DESCRIPTION OF THE INVENTION

Figure 1:
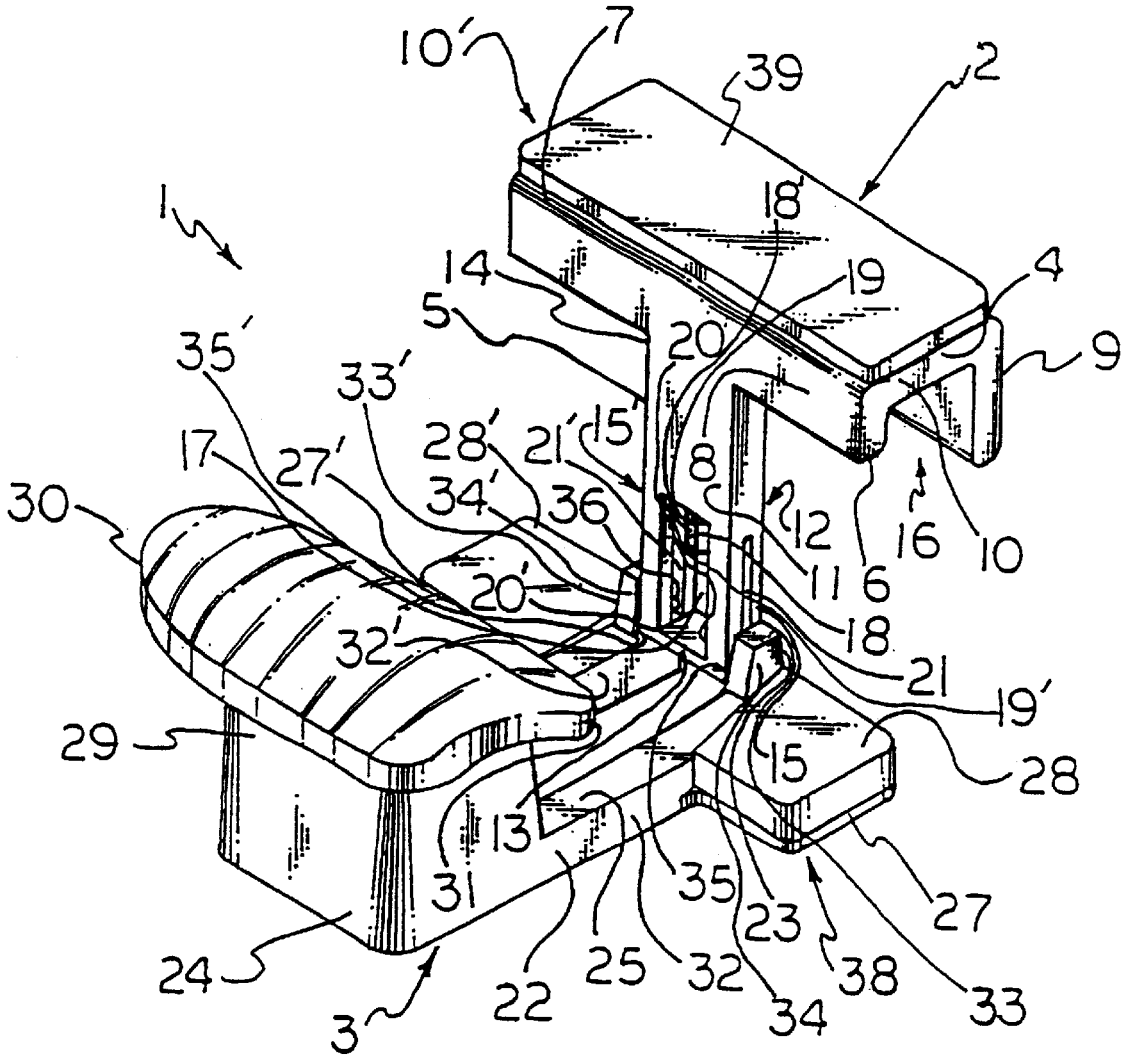
FIG. 1 is a back end isometric view of a device of this invention.
Figure 2:
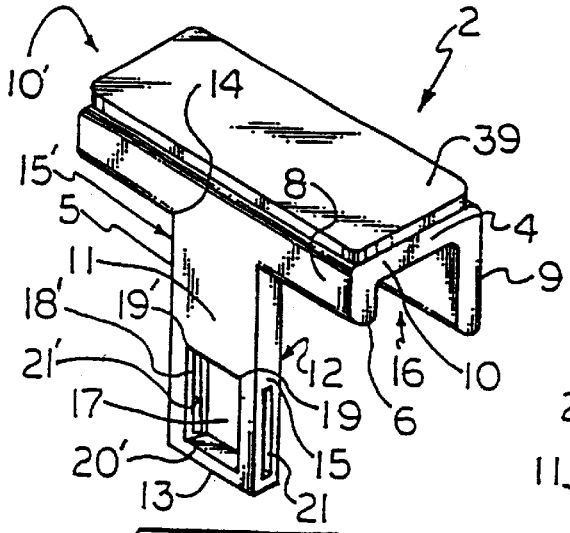
FIG. 2 is a back end isometric view of the forward unit of the device disengaged from the lower unit.
Figure 3:
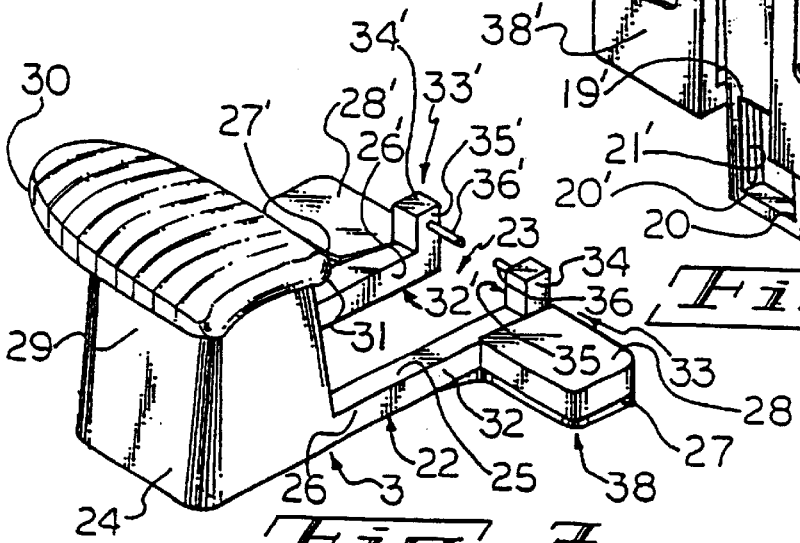
FIG. 3 is a back end isometric view of the lower unit of the device disengaged from the forward unit.

As noted above, and with reference to FIGS. 1 and 2, the seating and kneeling device 1 of this invention is shown in FIG. 1 in its operative position, fully opened. The device comprises two major units, the forward unit 2, which is shown in FIG. 2, and the lower unit 3, which is shown in FIG. 3.

The forward unit 2 is of a unitary construction and has a T-Shaped configuration. The T-shaped configuration is comprised of a top rest 4, and an upper support shaft 5. The top rest 4 has a bottom 6, a top surface 7, a near wall 8, a distal wall 9, and two essentially identical opposing ends 10 and 10'. Surmounting the top rest 4 is a pad 39 for resting forearms and elbows.

The upper support shaft 5 has a seat side 11 and a forward side 12, a bottom 13, a top end 14, and two identical side walls 15 and 15'.

The top rest 4 is integrally surmounted on the top end 7 such that the near wall 8 of the top rest 4 is essentially centered on the upper support shaft 5. The top rest 4 has an inverted L-shaped construction to provide a deep channel 16 in the bottom 6 of a top rest 4. The deep channel 16 is formed from the top rest near wall 8 and the top rest distal wall 9.

The support shaft 5 has an enlarged opening 17 in the seat side 11 which extends through the forward side 12 and near the upper support shaft bottom 13. The enlarged opening 17 has side interior walls 18 and 18' in it.

Each of the side interior walls 18 and 18' has a side interior wall top end 19 and 19' respectively, and a side interior wall bottom end 20 and 20' respectively. There is also shown in FIG. 2, slotted openings 21 and 21' which extend essentially from the side interior top end 19 and 19' respectively, to the side interior bottom ends 20 and 20' respectively. Each of the slotted openings 21 and 21' pass through the support shaft side walls 15 and 15', respectively.

With reference to FIG. 3, there is shown a lower unit 3 of the device of this invention. The lower unit 3 of unitary construction has a flat, T-shaped configuration comprised of a central support shaft 22, having a U-shaped configuration, a central support shaft front end 23, and a central support shaft back end 24, having a central support shaft top surface 25, and identical central support shaft side walls 26 and 26'.

The central support shaft 22 has essentially identical pad rests 27 and 27' mounted integrally, laterally on it, near the central support shaft front end 23 and each of the pad rests 27 and 27' have pads 28 and 28', respectively, thereon.

The central support shaft 22 has a seat 29 surmounted on the central support back end 24 and on the central support top surface 25, the seat 29 being surmounted by a pad 30, wherein the seat has a front end 31. The seat 29 is formed and tilted so as to be ergonomically acceptable to the user. Thus, the seat 29 is tilted such that it tilts forward and downwardly towards the forward unit 2, The degree of tilt from the horizontal is about 20°, plus or minus 10°, which is the accepted ergonomic positioning.

The central support shaft 22 has an enlarged opening therethrough, beginning at the seat front end 31 and extending through the central shaft front end 23 to form two, essentially identical side shafts 32 and 32' each having front terminal ends 33 and 33', respectively Each of the front terminal ends 33 and 33' is integrally surmounted by a pin block 34 and 34', and each pin block 34 and 34' has a pin block inside surface 35 and 35', respectively. The pin blocks 34 and 34' have centered in them, and securely anchored therein, pins 36 and 36'. The pins 36 and 36' are arranged such that when the forward unit 2 and the lower unit 3 are joined together, one of the pins 36 and 36' is insertable in each of the respective slotted openings 21 and 21' in the interior side walls 18 and 18' of the upper support shaft 5. The pins 36 and 36' are enabled to freely move in a vertical up and down movement in the slotted openings 21 and 21', and the units 2 and 3 are freely rotatable with respect to each other. The rotation is limited in that the units 2 and 3 can meet each other, but cannot pass each other in the rotation.

Figure 4:
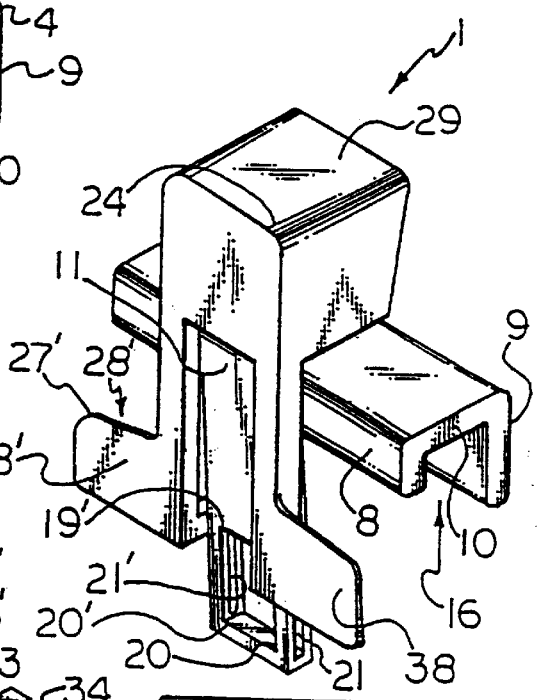
FIG. 4 is a back end isometric view of a device of this invention in the folded and locked position.

FIG. 4 is a view in perspective of the device of this invention from the back of the device, fully assembled, and in a folded position. The nominal size of the device 1 is about two foot high by two foot long by about 20 inches wide, but can vary to accommodate varying sizes of bathtubs and persons.

In use, the device 1 is laid out in a non-folded, fully open configuration and the deep channel 16 is lifted over and seated on and straddles the outer wall of a modern bathtub. The pad rests 27 and 27' rest by their bottoms 38 and 38' on the floor adjacent to the bathtub, and provide support for a person setting or kneeling on the device 1. The slotted openings 21 and 21' are long enough that the pins 36 and 36' can slide up and down in them and provide for an automatic adjustment of the device 1 for different sizes of bathtubs. Further, the central support shaft 22 of the device 1, since it is an extension of the framework from the rest pads 21 and 21', fully rests on the floor and acquires support therefrom.

When not in use, the device 1 can be folded as is shown in FIG. 4 and can be stored.

The device can be fabricated from lightweight metals such as aluminum, or can be, and is preferably fabricated from plastics. The choice of materials is based on the cost of fabrication, ability to clean the surfaces of the device, the durability of the device, and most of all, its ability to support a person, eventhough the person may be a large person. It is contemplated by the inventors herein that the mode of fabrication of the device 1 is not critical, as long as it results in a device having the above-mentioned properties and benefits. For example, the device 1 can be injection molded or blow molded, using plastic.

The device 1 has a minimal number of components, namely two, and thus its cost of fabrication is reduced. Further, the device will fit almost any bathtub found in homes across America. The design of the device 1 is such that the deep channel 16 is forced down onto the outside wall of a bathtub, while the lower unit 3 is automatically adjustable to the height of the tub.

The pads that are required for the seat, the knees and the elbow/forearms can be manufactured from a variety of products, and the actual type of pad is not critical to the utilize the benefits of the instant invention. It is contemplated that the pads can be removable such that they can be replaced when soiled or torn and thus, they can be clipped, adhered by an adhesive, or the like.

The sliding hinge arrangement provides for this upwardly, downwardly adjustment, as well as varying sizes of persons using the device. Further, the sliding hinge arrangement allows for quick adjustment into the storage position.

What is claimed is:

1. A seating and kneeling appliance comprising in combination:

(A.) a forward unit of unitary construction having a T-shaped configuration, said T-shaped configuration comprised of (i) a top rest and, (ii) an upper support shaft;

said top rest having a bottom, a top surface, a near wall, a distal wall, and two essentially identical opposing ends;

said upper support shaft having a seat side and a forward side, a bottom, a top end, and two identical side walls;

said top rest being integrally surmounted on the top end of the upper support shaft such that the near wall of the top rest is essentially centered on the upper support shaft;

said top rest having an inverted L-shaped construction to provide a deep channel in the bottom of the top rest, said deep channel formed from the top rest near wall and the top rest distal wall;

said support shaft having an enlarged opening in the seat side and extending through the forward side and near the upper support shaft bottom end, said enlarged opening providing side interior walls therein;

each of the said side interior walls having a side interior wall top end and a side interior wall bottom end and a slotted opening therein that extends essentially from the side interior top end to the side interior bottom end, each said slotted opening passing through the support shaft side walls;

(B.) a lower unit of unitary construction having a flat T-shaped configuration comprised of a central support shaft having a U-shaped configuration, a central support shaft front end and a central support shaft back end having a central support shaft top surface, a central support shaft top surface, and identical central support shaft side walls;

said central support shaft having essentially identical pad rests mounted integrally, laterally thereon, near the central support shaft front end, each said pad rest being surmounted by pads;

said central support shaft having a seat surmounted on the central support back end on the central support top surface, said seat being surmounted by a pad, said seat having a seat front end;

said central support shaft having an enlarged opening therethrough, beginning at the seat front end and extending through the central shaft front end, to form two, essentially identical side shafts having front terminal ends;

each of the front terminal ends being integrally surmounted by a pin block, each said pin block having a pin block inside surface; each said pin block having essentially centered, and securely anchored therein, a pin, such that when the components (A.) and (B.) are combined, one of the pins is insertable in each of the respective slotted openings in the interior side walls of the upper support shaft, such that said (A.) and said (B.) are connected together, and each is rotational with respect to the other.

2. The appliance as claimed in claim 1 which is fabricated entirely from plastic.

*3. A seating and kneeling appliance, comprising:*

*(a) a central support shaft having a bottom surface for resting horizontally on a floor adjacent to a bathtub and also having opposite front and rear end portions and a middle portion extending between and interconnecting said front and rear end portions, said middle portion having a top surface and a pair of opposite sides, said rear end portion rising substantially above said middle portion and front end portion;*

*(b) a seat surmounting a top of said rear end portion of said central support shaft for receiving buttocks of a user on said seat; and*

*(c) a pair of front rests mounted to opposite sides of and extending outwardly in opposite directions from said front end portion of said central support shaft and extending outwardly beyond said opposite sides and disposed below said top surface of said middle portion of said central support shaft such that said middle portion of said central support shaft and said front rests together, being located forwardly of the rear end portion and seat, have a generally T-shaped configuration for receiving the knees of the user on said front rests with the legs of the user supported on the floor and extending rearwardly from said front rests along said opposite sides of said middle portion and opposite sides of rear end portion of said central support shaft, said front rests also having bottoms substantially coplanar with said bottom surface of said central support shaft for resting horizontally on the floor with said central support shaft.*

*4. The appliance as claimed in claim 3 further comprising:*

*a pad surmounted on said seat.*

*5. The appliance as claimed in claim 3 further comprising:*

*a pair of pads each being mounted on one of said front rests.*

*6. The appliance as claimed in claim 3 wherein said seat surmounted on said top of said rear portion of said central support shaft is tilted forwardly and downwardly toward said front portion of said central support shaft.*

*7. A seating and kneeling appliance, comprising:*

*(a) a lower unit for resting horizontally on a floor adjacent to a bathtub and having opposite front and rear end portions, said lower unit including a seat on said rear end portion for receiving buttocks of a user on said seat and front rests on said front end portion for receiving knees of the user thereon, said rear end portion rising substantially above said front end portion; and*

*(b) a forward unit including*

*(i) an upper support shaft having opposite lower and upper ends, said upper support shaft being mounted at said lower end to said front end portion of said lower unit between said front rests thereof and extending generally upright therefrom, and*

*(ii) a top rest mounted on and extending laterally in opposite directions beyond opposite sides of said upper end of said upper support shaft and above said*

*front rests on said front end portion of said lower unit such that said upper support shaft and top rest together have a generally T-shaped configuration for receiving the forearms of the user on said top rest laterally outwardly from said opposite sides of said upper end of said upper support shaft and generally above the knees of the user on said front rest of said lower unit.*

*8. The appliance as claimed in claim 7 wherein said upper support shaft of said forward unit is pivotally mounted at said lower end to said forward portion of said lower unit for adapting said forward unit to undergo pivotal movement relative to said lower unit.*

*9. The appliance as claimed in claim 7 further comprising:*

*a pad surmounted on said seat.*

*10. The appliance as claimed in claim 7 further comprising:*

*a pad surmounted on said top rest.*

*11. A seating and kneeling appliance, comprising:*

(*a*) *a lower unit including*

(*i*) *a central support shaft having a bottom surface for resting horizontally on a floor adjacent to a bathtub and also having opposite front and rear end portions and a middle portion extending between and interconnecting said front and rear end portions, said middle portion having a top surface and a pair of opposite sides, said rear end portion rising substantially above said middle portion and front end portion,*

(*ii*) *a seat surmounting a top of said rear end portion of said central support shaft for receiving buttocks of a user on said seat, and*

(*iii*) *a pair of front rests mounted to opposite sides of and extending outwardly in opposite directions from said front end portion of said central support shaft and extending outwardly beyond said opposite sides and disposed below said top surface of said middle portion of said central support shaft such that said middle portion of said central support shaft and said front rests together, being located forwardly of the rear end portion and seat, have a generally T-shaped configuration for receiving the knees of the user on said front rests with the legs of the user supported on the floor and extending rearwardly from said front rests along said opposite sides of said middle portion and opposite sides of said rear end portion of said central support shaft, said front rests also having bottoms substantially coplanar with said bottom surface of said central support shaft for resting horizontally on the floor with said central support shaft; and*

(*b*) *a forward unit including*

(*i*) *an upper support shaft having opposite lower and upper ends, said upper support shaft being mounted at said lower end to said front end portion of said central support shaft of said lower unit between said front rests thereof and extending generally upright therefrom, and*

(*ii*) *a top rest mounted on and extending laterally in opposite directions beyond opposite sides of said upper end of said upper support shaft and generally above said front rests on said front end portion of said lower unit such that said upper support shaft and top rest together have a generally T-shaped configuration for receiving the forearms of the user on said top rest laterally outwardly from said opposite sides of said upper end of said upper support shaft and generally above the knees of the user on said front rest of said lower unit.*

*12. The appliance as claimed in claim 11 wherein said seat surmounted on said top of said rear portion of said central support shaft is tilted forwardly and downwardly toward said front portion of said central support shaft.*

*13. The appliance as claimed in claim 11 wherein said upper support shaft of said forward unit is pivotally mounted at said lower end to said forward portion of said lower unit between said front rests for adapting said forward unit to undergo pivotal movement relative to said lower unit.*

*14. The appliance as claimed in claim 11 further comprising:*

*a pad surmounted on said seat.*

*15. The appliance as claimed in claim 11 further comprising:*

*a pair of pads each being mounted on one of said front rests.*

*16. The appliance as claimed in claim 11 further comprising:*

*a pad surmounted on said top rest.*

* * * * *